(12) United States Patent
Brewer

(10) Patent No.: US 7,953,655 B1
(45) Date of Patent: May 31, 2011

(54) REVERSE AUCTION METHOD AND SYSTEM FOR NON-COMMODITY GOODS, SERVICES AND SYSTEMS

(75) Inventor: David J. Brewer, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1480 days.

(21) Appl. No.: 10/184,186

(22) Filed: Jun. 27, 2002

(51) Int. Cl.
*G06Q 40/00* (2006.01)
(52) U.S. Cl. .......................... 705/37; 705/35; 705/14.71
(58) Field of Classification Search .................... 705/35, 705/37, 11
See application file for complete search history.

(56) References Cited

U.S. PATENT DOCUMENTS

| 2002/0038282 A1* | 3/2002 | Montgomery | 705/37 |
| 2003/0004850 A1* | 1/2003 | Li et al. | 705/37 |
| 2003/0069825 A1* | 4/2003 | Hoffman et al. | 705/37 |
| 2004/0015391 A1* | 1/2004 | Dupreez et al. | 705/11 |
| 2005/0234798 A1* | 10/2005 | Du Preez et al. | 705/37 |

OTHER PUBLICATIONS

Aktas et al., Journal of Financial Economics. Amsterdam: Nov. 2010. vol. 98, Iss. 2, p. 241.*
Chen et al., International Journal of Produciton Economics. Amsterdam: Sep. 2010, vol. 127, Iss. 1, p. 203.*
Parkes et al., Management Science. Linthicum: Mar. 2005. vol. 51, Iss. 3, p. 435-451 (17 pp).*

* cited by examiner

*Primary Examiner* — Olabode Akintola
*Assistant Examiner* — Muriel Tinkler
(74) *Attorney, Agent, or Firm* — Jackson Walker L.L.P.

(57) ABSTRACT

A reverse auction method and system are provided for non-commodity goods, services, and systems. A purchaser creates a description of goods, services and/or systems required by the purchaser and sends the description to a number of potential vendors. In response, the vendors prepare an offer template provided by the purchaser showing the components and services proposed by each vendor and prices associated therewith for supplying the required goods, services or systems. The proposal/offer from each vendor is adjusted to ensure that the offer from each vendor will produce a similar and acceptable result. A downward bidding increments session sets downward bidding that is allowed by the vendor during a subsequent auction process. Each vendor executes a contract that is binding on the vendor if the vendor's bid during a subsequent auction process is accepted as the lowest bid. An auction is held in which each vendor bids against other vendors using the pre-negotiated downward bidding increments.

15 Claims, 3 Drawing Sheets

REVERSE AUCTION METHOD AND SYSTEM FOR NON-COMMODITY GOODS, SERVICES AND SYSTEMS

TECHNICAL FIELD

The present invention relates to a reverse auction method and system for non-commodity goods, services and systems.

BACKGROUND

Bidding processes are common for obtaining vendors and contracts for the design, production and delivery of non-commodity goods, services and systems. For example, if a telecommunications services provider desires to implement a new wireless telecommunications system in a region having no existing wireless telecommunication system, that services provider may send a request for proposal (RFP) to a number of prospective vendors of such wireless telecommunications systems. Because such a system is a non-commodity system, each vendor responding to the request for proposal likely will respond with a proposal that varies greatly from other competitor vendors.

For example, one vendor may be able to build the required wireless telecommunications system with 100 base stations, 150 switching stations and 10 different computer software applications. On the other hand, a competitor vendor who has designed base stations, switching stations and computer software applications according to a different model may be able to build the same wireless telecommunications system, but require 200 base stations, 50 switching stations, and only 3 computer software applications.

In the end, the performance guaranteed by each system, and the price associated therewith may be very similar even though the components of the systems and methods of implementing the systems differ greatly. Once various vendors have prepared responses to the RFP sent to the vendors by the purchaser, the purchaser analyzes each response and selects one of the proposals for implementation of the required system.

Unfortunately, with such systems, individual vendors have very little opportunity to know how their proposal is evaluated as compared to other proposals, and consequently, individual vendors seldom have an opportunity to modify their proposal or reduce the price in order to obtain a contract. That is, after the vendors submit their proposal and associated price, the vendors must simply wait until they are notified as to whether their proposal has been accepted. Once the purchaser accepts the proposal of one of the vendors, seldom is there an opportunity for a non-accepted vendor to reenter the process to modify their proposal and/or price.

Accordingly, there is a need for a reverse auction method and system that allows vendors to respond to requests for proposals and to bid on contracts associated with those proposals against competitive vendors in an auction environment. It is with respect to these and other considerations that the present invention has been made.

SUMMARY

Embodiments of the present invention solve the above and other problems by a reverse auction method and system for non-commodity goods, services, and systems. A purchaser creates a description of goods, services and/or systems required by the purchaser and sends the description to a number of potential vendors. In response, the vendors prepare an offer template provided by the purchaser showing the components and services proposed by each vendor and prices associated therewith for supplying the required goods, services or systems.

The preparation of the description and preparation of the return offer from the vendors may be done manually, or may be done electronically via an Internet-based or intranet-based communications session. Once the purchaser receives a proposal from each vendor, the purchaser adjusts each proposal from each vendor to normalize each of the proposals. During the normalization process, the purchaser conducts one-on-one communication with each vendor to protect each vendor's proprietary rights and information. At the conclusion of the normalization process, the purchaser ensures that the proposal from each vendor will now produce a similar and acceptable result. For example, if the purchaser requires a specific level of system performance, and one of the proposals from one of the vendors does not provide the requisite performance level, the normalization process allows the purchaser to require that vendor to add additional components or services or costs associated therewith to bring that vendor's proposal and offered performance levels to the level offered by other vendors as required by the purchaser's description.

After all offers have been normalized, the purchaser engages in another one-on-one collaborative communication with each vendor to pre-negotiate downward bidding increments that will be allowed by the vendor during a subsequent auction process. For example, during the collaborative communication, the purchaser and the vendor will agree in advance on acceptable reductions in performance and/or quality associated with downward bids proposed by the vendor to be made during the bidding process.

Once proposals from all vendors have been normalized and downward bidding increments have been pre-negotiated and agreed to between the purchaser and each vendor separately, each vendor executes a contract which will be binding on the vendor if the vendor's bid during a subsequent auction process is accepted as the lowest bid.

After contracts are executed by each prospective vendor, an auction is held in which each vendor bids against other vendors using the pre-negotiated downward bidding increments. Once a lowest bid is obtained, the vendor with the lowest bid is accepted and that vendor's pre-negotiated and executed contract becomes the contract for delivery of the described goods, services or systems. The auction may be held face-to-face in a manual bidding process, or the entire auction may be held in an online Internet-based or intranet-based communications system via a distributed computing environment.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a reverse auction method and system for non-commodity goods, services and systems.

Figure 2:
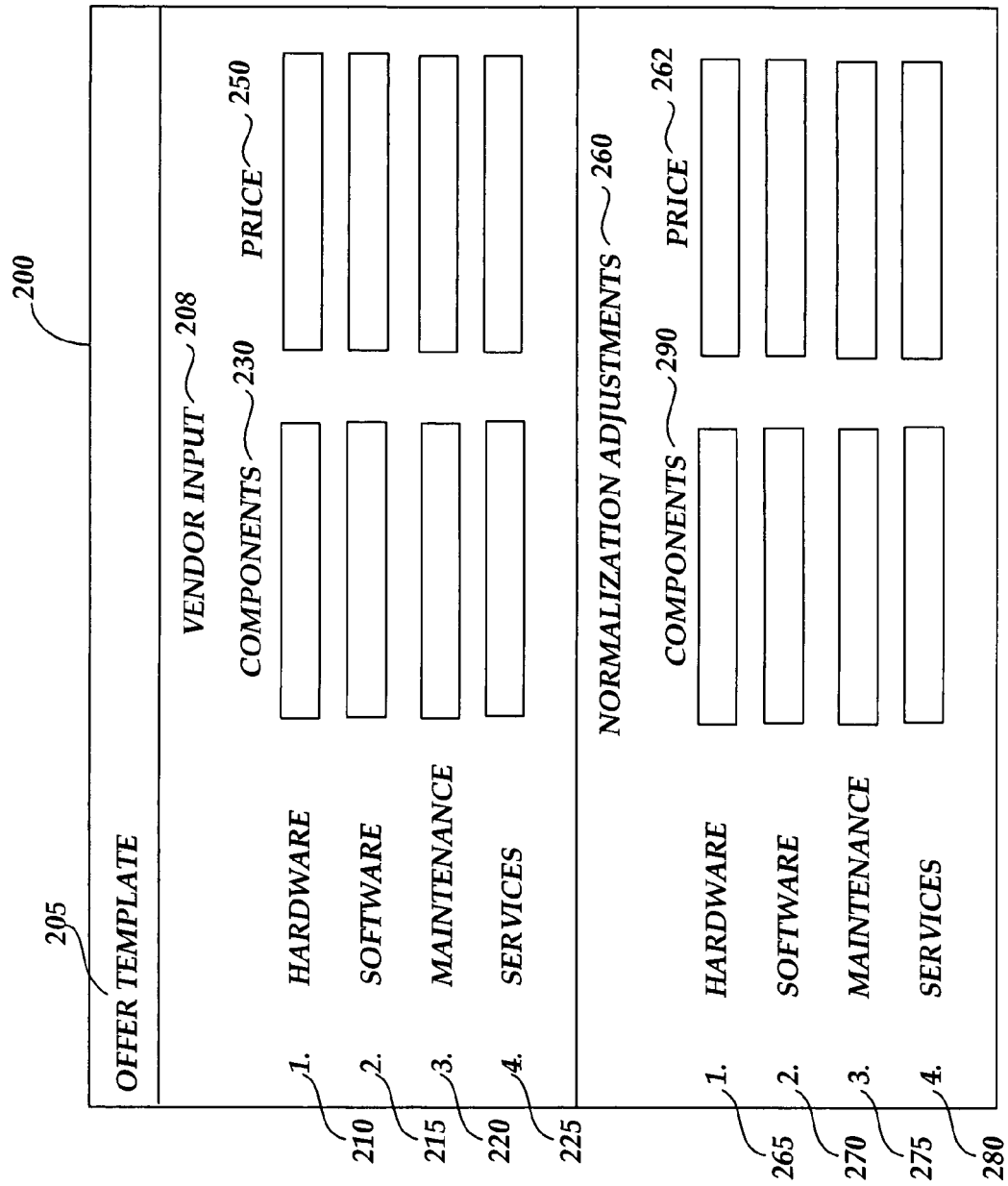
FIG. 2 illustrates an offer template that may be used manually or that may be submitted via a distributed computing environment from a prospective vendor to a purchaser illustrating a vendor's proposal in an upper half of the template and illustrating normalization adjustments by the purchaser and the vendor in the lower half of the template.

FIG. 2 illustrates an offer template that may be used manually or that may be submitted via a distributed computing environment from a prospective vendor to a purchaser illustrating a vendor's proposal in an upper half of the template and illustrating normalization adjustments by the purchaser and the vendor in the lower half of the template. The offer template 205 is forwarded to the prospective vendors by the purchaser as part of a request for proposal (RFP) prepared and forwarded by the purchaser to the prospective vendors.

The purchaser prepares a description of the required goods, services or systems for which the purchaser requires proposals from the various vendors. For example, if the required system is a new telecommunications system to be operated by a telecommunications service provider, the description may include systems requirements, including performance levels and the number of future subscribers that must be serviced by the new system.

In response, each vendor prepares the offer template 205 either manually or via a distributed computing environment whereby the offer template 205 is prepared and forwarded electronically to the purchaser. The upper portion of the template includes a vendor input section 208 where the vendor proposes all hardware, software, maintenance systems, and services for providing the described system. The price 250 associated with the components 230 are included by the vendor to create a total offer by the vendor.

For example, the vendor may complete the hardware component section with a number of base and switching stations required to create a new wireless telecommunications system. The software section may be completed with the quantity, quality, and types of computer software applications proposed by the vendor for operating the wireless communications system. The maintenance, components and prices may include the number of maintenance personnel, maintenance schedules and types of maintenance activities and a quoted price associated therewith. The services section 225 may include proposed and anticipated services required for delivering, operating and updating the delivered system.

Once the offer template 205 is submitted to the purchaser by the vendor either manually or electronically via a distributed computing environment, the purchaser compares each vendor input against the system requirements to determine whether each vendor's proposal accurately and adequately fulfills the described goods, services or systems requirements. Each vendor's proposed components and prices may differ greatly with each other vendor because each vendor may accomplish the same desired result in a different manner. For example, a first vendor may require 100 base stations, 150 switching stations and 10 computer software applications for a new wireless telecommunications system, while a second vendor may require 200 base stations, 75 switching stations and 50 computer software applications for producing the same result. However, the system performance and price associated with each of the differing proposals may be quite similar.

If the proposal from any individual vendor is lacking in some area, such as performance level for a given system, the normalization adjustment section 260 of the bottom portion of the offer template is used by the purchaser in a one-on-one collaborative communication with that vendor to change the vendor's proposal to normalize the vendor's proposal with other proposals submitted in response to the RFP. For example, if a first vendor's hardware proposal fails to give required performance levels, the purchaser may require the vendor to increase the number of proposed hardware components or add additional hardware components to bring the vendor' proposal to the required performance level. For example, if a telecommunications service system purchaser requires a proposed wireless telecommunication system to be able to process a given number of call attempts over a given period and the hardware proposed by a given vendor fails to ensure the required level of performance, the purchaser may require the vendor to increase the number of hardware components or add additional types of hardware components to ensure the required level of performance in the normalization adjustments section 260 of the offer template. Accordingly, once the normalization process is completed between the purchaser and each vendor separately, each vendor's starting proposal will provide acceptable goods, services, and/or systems for fulfilling the requirements of the purchaser.

Figure 1:
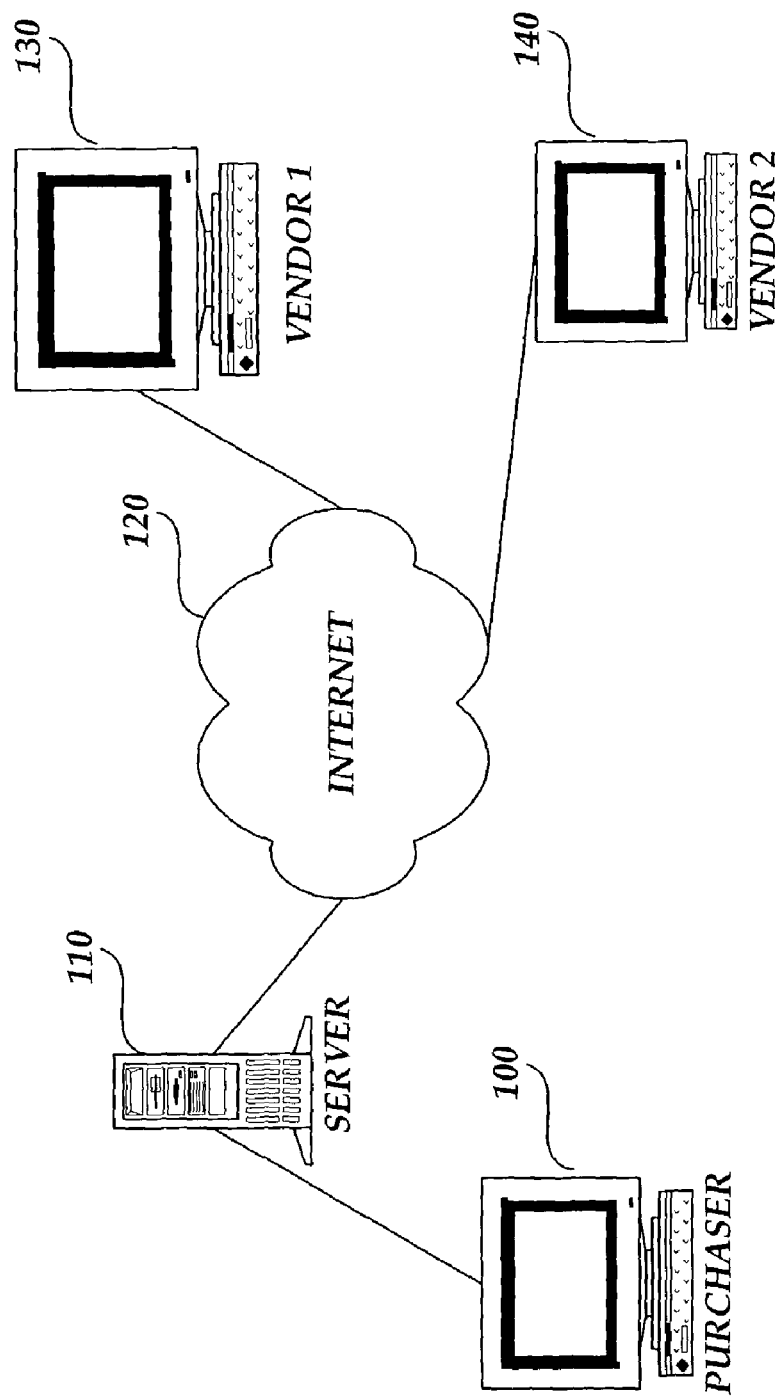
FIG. 1 is a block diagram illustrating components of a distributed computing environment through which a proposal preparation and auction process according to an embodiment of the present invention may be accomplished.

FIG. 1 is a block diagram illustrating components of a distributed computing environment through which a proposal preparation and auction process according to an embodiment of the present invention may be accomplished. As described above, the auction method and system of the present invention may be conducted manually between the purchaser and the prospective vendors, or alternatively, the process may be conducted via a collaborative communication between the purchaser and the prospective vendors via a distributed computing environment as illustrated in FIG. 1. The purchaser operating a purchaser computing system 100 which may be a single computing system or a network of connected computes, such as is found in a company, an educational institution, or large operation, directs the request for proposal to each of the prospective vendors such as the vendor 1 and vendor 2 via the computer systems 130 and 140. Alternatively, the purchaser may post the RFP on a purchaser Internet-based website operated at the server 110.

As illustrated in FIG. 1, the proposal may be sent via a remote server system 110 across the Internet 120 to the prospective vendors. The server 110 may be an electronic mail server, or may be a web server for publication of proposals by the purchaser for download by the vendors via the Internet 120. As should be understood by those skilled in the art, the distributed computing environment may also operate via an intranet-based system or in any suitable distributed computing environment where the purchaser may engage in one-on-one or simultaneous communications with different vendors. During the auction session, the purchaser and the prospective vendors may engage in a group collaborative bidding and auction session such as is common with Internet-based chat rooms whereby each party may send and receive messages that may be reviewed and responded to by any other authorized member of the chat session. According to an embodiment of the present invention, during the auction session, each prospective vendor and the purchaser will conduct and respond to bids in a single open chat session in which all the authorized parties are included.

Figure 3:
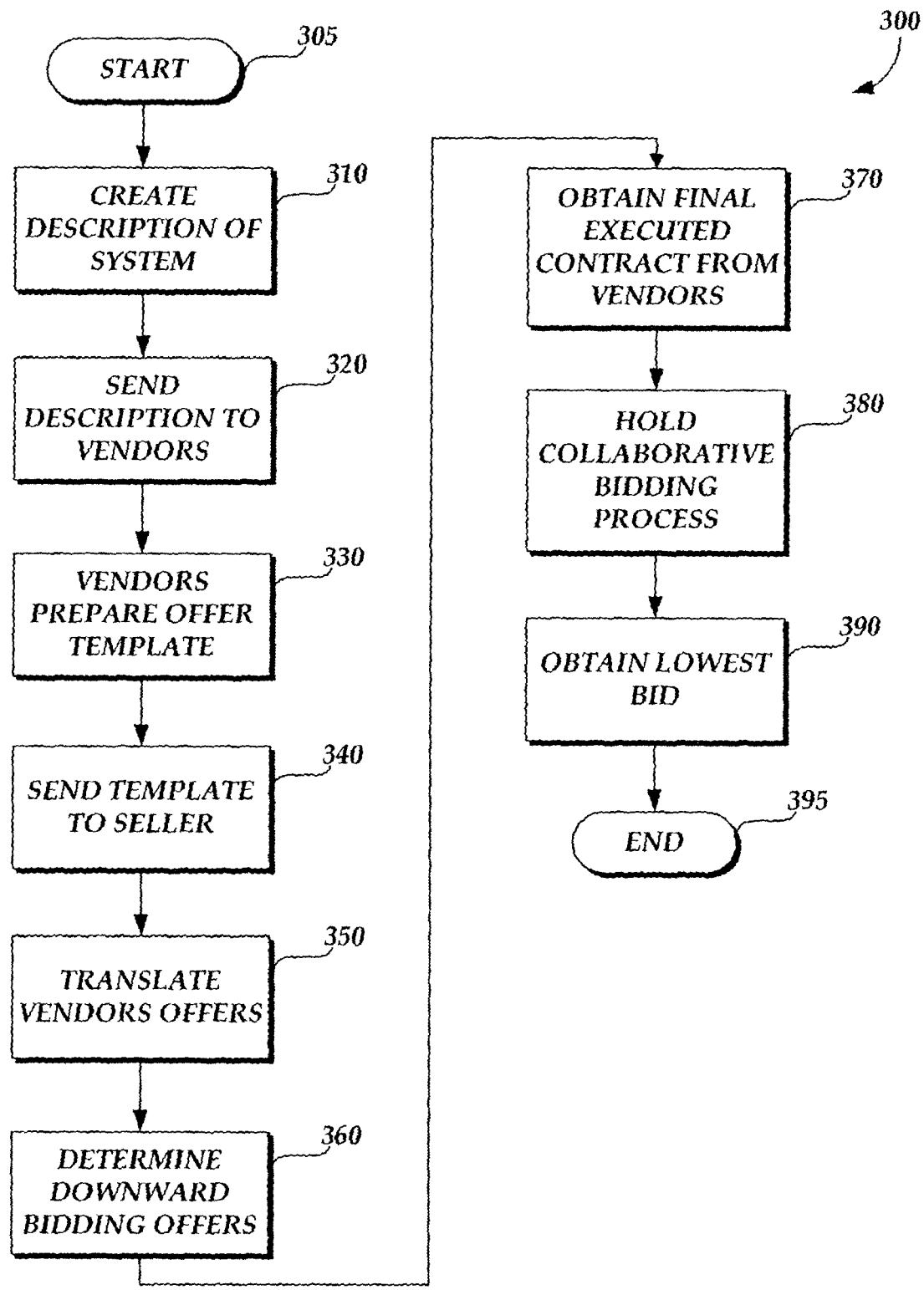
FIG. 3 illustrates a logical flow of the steps performed by a reverse auction method and system for non-commodity goods, services and systems according to an embodiment of the present invention.

FIG. 3 illustrates a logical flow of the steps performed by an auction method and system for non-commodity goods, services and systems according to an embodiment of the present invention. The method 300 begins at step 305 and proceeds to step 310 where the purchaser creates a description of the goods, services, or systems for which it requires proposals from prospective vendors. For purposes of the description of FIG. 3, assume for example that a purchaser provides a description of a prospective wireless telecommunications system the purchaser would like to operate in a given region. As should be understood, the reverse auction for non-commodity goods, services, and systems described herein may be used with any goods, services or systems, including commodity goods, services and systems, for which a purchaser requests proposals from various vendors.

Following with the present example, the purchaser prepares a complete description of the proposed wireless communication system requirements, performance requirements, services requirements and maintenance requirements. At step 320, the description, and the offer template are forwarded to prospective vendors either manually or via the distributed computed environment illustrated in FIG. 1. At step 330, each vendor prepares an offer by completing the vendor input section 208 of the offer template to provide each vendor's proposed hardware, software, maintenance systems and services systems along with associated prices to the purchaser. At step 340, each vendor's proposed template is sent to the purchaser either manually or from the vendor's computers 130, 140 to the purchaser's computer 100, illustrated in FIG. 1.

At step 350, the purchaser analyzes each proposal from each vendor against the system requirements, and opens a one-on-one communication session with each vendor to adjust each vendor's proposal with the system requirements and with other vendor's proposals so that prior to the commencement of the auction process, each vendor's proposal will adequately and accurately fulfill the system requirements compared to other vendors and compared to the system requirements created by the purchaser. As described with reference to FIG. 2, a given vendor, for example, may propose hardware systems that will not comply with the system requirements. During the normalization and adjustment phase at step 350, the purchaser will work with that vendor to add additional hardware components or add different types of hardware components that are necessary to ensure that vendor's proposal complies with the system requirements set out by the purchaser.

At step 360, the purchaser engages in a one-on-one communication session with each vendor to predetermine and pre-negotiate downward bidding increments acceptable by the purchaser from each vendor during the auction process. During the communications session between the purchaser and the vendor, at step 360, each downward bidding increment is analyzed as to its effects on system requirements and performance levels to prevent a vendor from bidding downwardly during the auction process to win the auction process, but without regard to unacceptable downgrades in system requirements and performance levels.

For example, if a purchaser requires that a set number of call attempts over a given period must be accurately and efficiently processed by the required system, a vendor, who in its initial bid proposal, proposed hardware and software that would greatly exceed the system requirements may be allowed to pre-negotiate a downward bid that will reduce its proposed hardware and software along with an associated reduction in price in an effort to have a downward bid ready to compete with other vendors. In this case, if the downward adjustments in the hardware and software proposed by the vendor does not reduce the ability of the vendor to provide the required systems and performance levels, the downward bid will be accepted by the purchaser. On the other hand, the vendor will not be allowed to alter its proposed hardware, software, maintenance, or services below required levels in order to reduce its bid during the auction process.

Accordingly, under this embodiment of the present invention, each vendor who negotiates and sets downward bidding increments that may be used during the auction process, and it is known between the purchaser and the vendor during the auction process that the vendor is not undercutting performance levels or system requirements in order to compete with other vendors. Similarly, by engaging in the described one-on-one communication session between the purchaser and each vendor, other vendors will not gain access to highly sensitive proprietary information associated with the operating characteristics and performance levels of systems being offered by other vendors.

During the downward bidding increments preparation process a discount structure may be operated between the purchaser and each of the vendors to allow the vendors to build discounts into their proposed bids and downward bidding increments based on anticipated performance levels from each vendor. For example, if at the time of bidding, a vendor knows that to provide the required hardware, the vendor must provide two switching stations at a set cost, but the vendor is confident that by the time the system is actually built the vendor's new and more advanced switches will be able to give the required performance levels for a reduced cost, the vendor may be allowed to bid down to the anticipated reduced cost so long a the vendor agrees that, if at the time of actually building this system, the vendor's advanced switch is not available, the vendor will provide additional switching systems required to provide the required performance levels. On the other hand, the purchaser may not agree to such a built-in discount structure on such areas as services where the purchaser requires a set level of services regardless of hardware and software advancements.

At step 370, after the offers have been normalized and adjusted and allowable downward bidding increments have been pre-negotiated and agreed to by the parties, each prospective vendor executes a final contract between it and the purchaser. The final contract may be forwarded to the purchaser or may be sent to the purchaser via the distributed computing environment described with reference to FIG. 1. Accordingly, after the auction process is complete, the vendor that wins the auction will have a contract, covering the previously agreed to goods, services, and/or systems delivery.

At step 380, the purchaser conducts the auction process between the purchaser and the prospective vendors. As described above, the auction may be held in a face-to-face setting, or the entire auction may be held via a distributed computing environment. The auction may begin with each prospective vendor issuing its starting price associated with its proposal. During a second round of bids, each vendor will have heard or will have seen via its computing system the bids proposed by each other vendor. Each vendor may then lower its price with one of the previously negotiated downward bidding increments in order to arrive at a lower price than its competitive vendors. This process may then continue until a lowest price is obtained through the bidding process.

At step 390, the purchaser obtains the lowest bid from one of the prospective vendors and that vendor's proposal is accepted. Because the final contracts were previously executed by each prospective vendor, acceptance of the lowest bid by the purchaser, at step 390, ends the process and that vendor's contract is accepted as the final contract for delivering the required goods, services, or systems.

It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

I claim:

1. A method for providing a reverse auction via a distributed computing environment, comprising:
   creating an electronic description of a system to be purchased by auction by a purchaser;
   electronically forwarding the description to a plurality of vendors;
   receiving from each of the plurality of vendors an electronically transmitted vendor proposal to supply the system;
   conducting, by a purchaser, a private one-on-one pre-negotiation with each vendor to ensure that the proposal from each vendor will produce a similar and acceptable result, including:
      adjusting components, services or costs to alter performance levels to the level offered by other vendors as required by the electronic description of the system;
   conducting an increment negotiation session between the purchaser and each of the plurality of vendors separately to preset permissible downward bidding increments for each of the plurality of vendors during the auction, including:
      determining acceptable reductions in system performance associated with downward bids made by the vendor during the auction;
   each of the plurality of vendors executes a contract which will be binding on the vendor if the vendor's bid during a subsequent auction process is accepted as the lowest bid;
   conducting, via the distributed computing environment, the auction during which the plurality of vendors bid for supplying the system to the purchaser;
   allowing the at least one vendor to downwardly bid against other vendors; and
   analyzing, via a processor, a downward bid from the at least one vendor to determine if a corresponding reduction in system performance associated with the downward bid is acceptable and if not, then preventing the vendor from downwardly bidding.

2. The method of claim 1, further comprising accepting a lowest bid of one of the plurality of vendors for supplying the system.

3. The method of claim 1, further comprising, prior to creating a description of the system, preparing a request for a proposal to be sent to each of a plurality of vendors including a list of required components of the system.

4. The method of claim 3, wherein forwarding the description to a plurality of vendors includes forwarding a vendor offer template to each of the plurality of vendors having a vendor offer section and a vendor offer adjustment section.

5. The method of claim 4, wherein forwarding a vendor offer template to each of the plurality of vendors, includes posting the description of the system and the vendor offered template on an internet-based website operated by the purchaser and accessible by each of the plurality of vendors.

6. The method of claim 5, whereby the step of receiving includes receiving the vendor offer template from each of the plurality of vendors.

7. The method of claim 6, wherein receiving the vendor offer template from each of the plurality of vendors includes receiving the vendor offer template at a purchaser computing system via a distributed computing environment.

8. The method of claim 1, wherein the system is further operative to adjust the vendor offer to cause the vendor offer to comply with the description of the system.

9. The method of claim 7, further comprising adjusting the vending offer from the at least one vendor to cause the vendor offer to comply with the description of the system.

10. The method of claim 9, whereby the step of determining the acceptable reductions includes conducting the downward bidding increment negotiation session electronically via the distributed computing environment in a collaborative electronic communication session between the purchaser and the at least one vendor.

11. The method of claim 10, wherein conducting the auction includes conducting the auction via an electronic online communication between the purchaser and each of the plurality of vendors in which each of the plurality of vendors may communicate with other vendors and with the purchaser simultaneously.

12. A computing system for providing a reverse auction via a distributed computing environment, comprising:
    a processor; and
    a server operative to perform the following:
    transmit a description of a system to be purchased by auction by a purchaser to a plurality of vendors;
    receive from each of the plurality of vendors an electronically transmitted vendor offer to supply the system and to transmit the offer to the purchaser;
    conduct, by a purchaser, a private one-on-one pre-negotiation with each vendor to ensure that the proposal from each vendor will produce a similar and acceptable result, including:
       adjusting components, services or costs to alter performance levels to the level offered by other vendors as required by the electronic description of the system;
    facilitate via an online session an increment negotiation session between the purchaser and each of the plurality of vendors separately to preset permissible downward bidding increments for each of the plurality of vendors during the auction, including:
       determining acceptable reductions in system performance associated with downward bids made by the vendor during the auction;
    each of the plurality of vendors executes a contract which will be binding on the vendor if the vendor's bid during a subsequent auction process is accepted as the lowest bid;
    conducting the auction via an electronic online communication between the purchaser and each of the plurality of vendors in which each of the plurality of vendors may communicate with other vendors and with the purchaser simultaneously in a bidding session for supplying the system to be purchased to the purchaser; and
    analyze a downward bid from the at least one vendor submitted during the auction to determine if the reduction in system performance corresponding to the downward bid is acceptable and, if not, then preventing the downward bid.

13. The system of claim 12, whereby the distributed computing environment includes a server on which is operated an Internet-based website operated by the purchaser and accessible by each of the plurality of vendors for posting the description of the system to be purchased, and for depositing the vendor offer with the purchaser.

14. The system of claim 12, wherein the description of the system to be purchased posted on the Internet-based website includes a vendor offer template for completion by each of the plurality of vendors, the vendor offer template having a vendor offer section and a vendor offer adjustment section.

15. A computer program product comprising a non-transitory computer readable medium configured for causing a computer to provide a reverse auction, the program product configured to:
- create a description of a system to be purchased by auction;
- electronically forward the description to a plurality of vendors;
- receive from each of the plurality of vendors an electronically transmitted vendor proposal to supply the system;
- conduct, by a purchaser, a private one-on-one pre-negotiation with each vendor to ensure that the proposal from each vendor will produce a similar and acceptable result, including:
  - adjusting components, services or costs to alter performance levels to the level offered by other vendors as required by the electronic description of the system;
- conduct an increment negotiation session between the purchaser and each of the plurality of vendors separately to preset permissible downward bidding increments for each of the plurality of vendors during the auction, including:
  - determining acceptable reductions in system performance associated with downward bids made by the vendor during the auction;
- each of the plurality of vendors executes a contract which will be binding on the vendor if the vendor's bid during a subsequent auction process is accepted as the lowest bid;
- conduct the auction during which the plurality of vendors bids for supplying the system to the purchaser;
- allow the vendors to downwardly bid against other vendors; and
- analyze a downward bid from the at least one vendor to determine if a reduction in system performance associated with the downward bid is acceptable and if not, then preventing the vendor from downwardly bidding.

* * * * *